United States Patent
Dole

(10) Patent No.: US 8,297,137 B2
(45) Date of Patent: Oct. 30, 2012

(54) HOLLOW PLASTIC BODY WHICH IS USED, IN PARTICULAR, TO LINE STEERING WHEEL COLUMNS IN MOTOR VEHICLES

(75) Inventor: Thierry Dole, Saint-Germain la Poterie (FR)

(73) Assignee: Faurecia Interieur Industrie, Nanterre (FR)

(*) Notice: Subject to any disclaimer, the term of this patent is extended or adjusted under 35 U.S.C. 154(b) by 919 days.

(21) Appl. No.: 11/913,998

(22) PCT Filed: May 10, 2006

(86) PCT No.: PCT/FR2006/001043
§ 371 (c)(1),
(2), (4) Date: Jan. 9, 2008

(87) PCT Pub. No.: WO2006/120344
PCT Pub. Date: Nov. 16, 2006

(65) Prior Publication Data
US 2008/0196535 A1     Aug. 21, 2008

(30) Foreign Application Priority Data
May 13, 2005   (FR) ................................. 05 04858

(51) Int. Cl.
| F16H 21/10 | (2006.01) |
|---|---|
| G06G 3/00 | (2006.01) |
| H01Q 3/08 | (2006.01) |
| A41F 1/00 | (2006.01) |
| A43C 11/00 | (2006.01) |
| A44B 1/04 | (2006.01) |
| A44B 17/00 | (2006.01) |
| B25G 3/18 | (2006.01) |
| F16B 21/00 | (2006.01) |
| F16D 1/00 | (2006.01) |

(52) U.S. Cl. .............................. 74/1 R; 24/614; 403/326
(58) Field of Classification Search ................... 24/297, 24/614, 618, 457, 458, 619; 403/326, 335, 403/338; 180/78; 74/492, 493, 484 R
See application file for complete search history.

(56) References Cited

U.S. PATENT DOCUMENTS
1,957,141 A * 5/1934 Jordan ........................... 24/616
(Continued)

FOREIGN PATENT DOCUMENTS
JP           08-119120 A     5/1996
(Continued)

OTHER PUBLICATIONS

International Search Report of PCT/FR2006/001043 filed May 10, 2006, date of mailing Aug. 17, 2006.

*Primary Examiner* — Troy Chambers
*Assistant Examiner* — Michael Gonzalez
(74) *Attorney, Agent, or Firm* — Young & Thompson

(57) ABSTRACT

A hollow body of plastics material for placing around a motor vehicle steering column, the body including two half-bodies (2, 4) assembled to each other by tabs (22) and snap-fastener elements (24), each tab (22) including a portion in relief (28) provided with a first catch bearing surface. The snap-fastener elements (24) include a housing for each tab, the housing presenting at least one constriction, the portions in relief (28) being retained in the housings by the constrictions, the bearing surfaces of the tabs coming into contact with the complementary bearing surfaces of the constrictions on planes inclined at an angle ($\alpha$) selected to enable the portions in relief (28) to go past the constrictions by elastic deformation when the two half-bodies (2, 4) are pulled apart from each other with a predetermined force.

9 Claims, 2 Drawing Sheets

U.S. PATENT DOCUMENTS

| | | | | |
|---|---|---|---|---|
| 3,224,062 | A * | 12/1965 | Polonsky | 24/618 |
| 3,768,846 | A * | 10/1973 | Hensley et al. | 52/127.5 |
| 4,757,894 | A * | 7/1988 | Schreckenstein | 206/3 |
| 4,867,599 | A * | 9/1989 | Sasajima | 403/338 |
| 5,699,601 | A * | 12/1997 | Gilliam et al. | 29/278 |
| 6,578,449 | B1 * | 6/2003 | Anspaugh et al. | 74/606 R |
| 7,021,019 | B2 * | 4/2006 | Knauseder | 52/588.1 |
| 7,275,289 | B2 * | 10/2007 | Lipniarski | 24/297 |
| 7,360,964 | B2 * | 4/2008 | Tsuya et al. | 403/280 |
| 7,966,702 | B2 * | 6/2011 | Horimatsu et al. | 24/297 |
| 7,979,966 | B2 * | 7/2011 | Yoshie | 24/615 |
| 8,043,038 | B2 * | 10/2011 | Sano | 411/45 |
| 8,046,879 | B2 * | 11/2011 | Werner et al. | 24/297 |
| 8,056,193 | B2 * | 11/2011 | Park | 24/297 |
| 8,079,117 | B2 * | 12/2011 | Pontaoe | 24/616 |
| 2004/0154429 | A1 * | 8/2004 | Rhea et al. | 74/558 |
| 2011/0020059 | A1 * | 1/2011 | Yin et al. | 403/326 |
| 2011/0119875 | A1 * | 5/2011 | Iwasaki | 24/458 |
| 2011/0179606 | A1 * | 7/2011 | Magno et al. | 24/457 |

FOREIGN PATENT DOCUMENTS

JP     2002-067974 A     3/2002

* cited by examiner

HOLLOW PLASTIC BODY WHICH IS USED, IN PARTICULAR, TO LINE STEERING WHEEL COLUMNS IN MOTOR VEHICLES

BACKGROUND OF THE INVENTION

The invention relates in general to pieces of trim molded out of plastics material for use in motor vehicles.

More precisely, the invention relates to a hollow body of plastics material for placing around a motor vehicle steering column, the body comprising two half-bodies and assembly means for assembling the half-bodies to each other in a longitudinal direction, the assembly means comprising a plurality of longitudinal tabs each secured to one of the half-bodies, and snap-fastener means for fastening each tab to the other half-body, each half-body comprising a concave shell with its concave side facing towards the other half-body, said shell presenting an inside face, each tab comprising a longitudinal arm presenting one end secured to the corresponding half-body and a portion in relief projecting along a portion of the arm that is remote from the half-body, said portion in relief including a first catch bearing surface.

Document EP-1 391 351 describes such a hollow body comprising two half-bodies assembled together by tabs secured to one of the half-bodies, and having portions in relief that engage in windows formed in the shell of the other half-body.

Such hollow bodies need to be manufactured with manufacturing tolerances that are very small so as to guarantee that the portions in relief of the tabs snap properly into the windows. The slightest deformation of the shell in which the windows are formed can lead to the tabs engaging poorly, and thus to the two half-bodies being poorly fastened to each other. Furthermore, the existence of windows formed in the hollow body gives it an appearance that is not very agreeable.

In this context, the invention seeks to propose a hollow body in which the assembly means are less sensitive to manufacturing tolerances, and that presents a better appearance, while also enabling the two half-bodies to be separated easily.

SUMMARY OF THE INVENTION

To this end, the invention provides a hollow body of the above-specified type, characterized in that the snap-fastener means comprise, for each tab, a housing formed on the inside face of the corresponding half-body, the housing presenting an opening and being defined by at least two facing parallel longitudinal walls at a predetermined spacing, comprising a first wall forming a rear bearing surface for the tab and a second wall including at least one constriction locally narrowing the spacing between the two walls, the constriction having a second bearing surface, the tabs being suitable for being inserted longitudinally into the housings via their respective openings, the portions in relief being suitable for going past the constrictions in the longitudinal insertion direction of the tabs by elastic deformation of the tabs and/or of said second walls, the portions in relief being held in the opposite direction by the constrictions by virtue of the respective bearing surfaces of the tabs coming into contact with the complementary bearing surfaces of the constrictions on planes that are inclined at a predetermined angle relative to the longitudinal direction, said angle being selected to make the portions in relief suitable for going past the constrictions by elastic deformation in the opposite direction when the two half-bodies are moved apart from each other by means of a predetermined longitudinal force.

The hollow body may also present one or more of the following characteristics considered individually or in any technically feasible combination:

the walls are ribs formed on the inside face of the half-body;

the walls lie in planes substantially perpendicular to the inside face of the half-body on which they are formed;

each portion in relief is formed on a face of the corresponding tab that is substantially perpendicular to the inside face of the half-body carrying said tab;

the angles of inclination of the contact planes lie in the range 50° to 70°;

at least one housing presents a closure web on a side remote from the inside face of the half-body, the closure web interconnecting the two walls;

the tabs and the housings are integrally molded with the half-bodies;

the tabs are hollow;

the arms of the tabs comprise two spaced-apart facing plane portions together with partitions interconnecting the two walls; and said portions are perpendicular to the zone of the inside face of the half-body that carries the tab.

BRIEF DESCRIPTION OF THE DRAWINGS

Other characteristics and advantages of the invention appear from the following description made by way of non-limiting indication and with reference to the accompanying figures, in which.

DETAILED DESCRIPTION OF THE PREFERRED EMBODIMENTS

Figure 1:
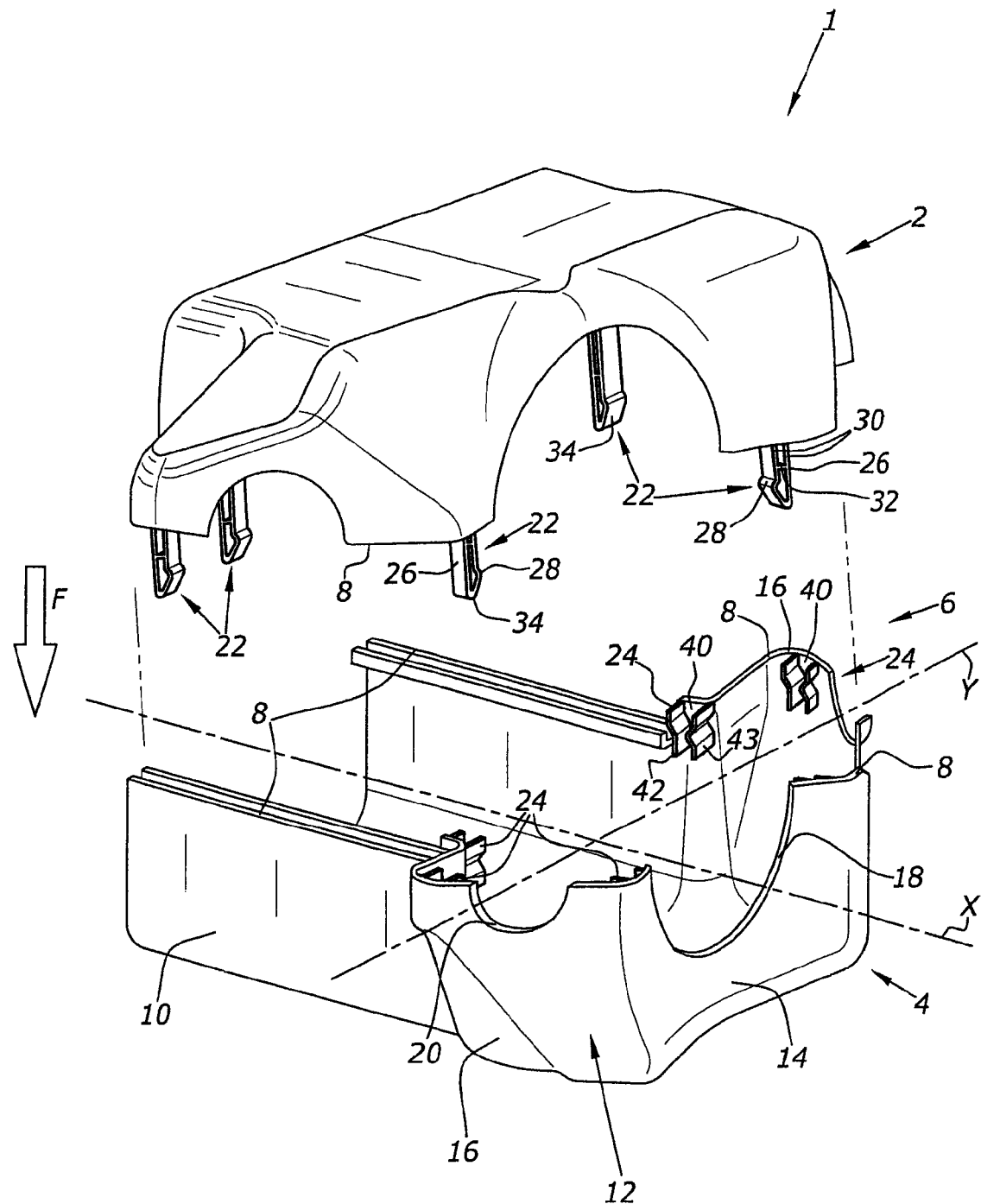
FIG. 1 is an exploded perspective view of the hollow body of the invention.
Figure 2:
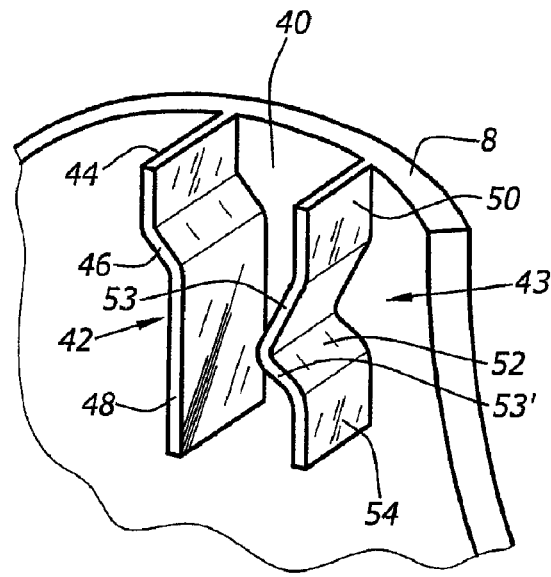
FIG. 2 is an enlarged view of a detail of FIG. 1, showing a tab-receiving housing.

The hollow body 1 shown in FIG. 1 is a body molded out of plastics material, for placing around a steering column of a motor vehicle (not shown).

The body 1 comprises top and bottom half-bodies 2 and 4, and assembly means 6 for assembling the half-bodies one to the other in a longitudinal direction represented by arrow F in FIG. 1. Each of the top and bottom half-bodies 2 and 4 forms a concave shell with its concave side facing towards the other half-body and presenting a free edge 8, with the top and bottom half-bodies 2 and 4 coming into contact with each other along their respective free edges 8.

The steering column can pass through the hollow body 1 along an axis X that is perpendicular to the longitudinal direction.

Each half-body 2, 4 comprises a portion 10 in the form of a rectangular parallelepiped with a U-shaped rectangular section in a plane perpendicular to the axis X, and extended axially by an enlarged portion 12. The free edges 8 of the parallelepipedal portion 10 are straight lines, parallel to the axis X and they lie in a first contact plane perpendicular to the longitudinal direction. The portion 10 is open at both of its axial ends.

Opposite from the portion 10, the enlarged portion 12 presents a plane face 14 that is substantially perpendicular to the axis X, and two noses 16 on respective sides of the face 14, uniting the face 14 with an axial end of the portion 10.

The face 14 is solid and, in a transverse direction Y perpendicular to the axis X and to the longitudinal direction, it presents a width that is substantially equal to the width of the portion 10. The noses 16 project transversely relative to the portion 10 and to the face 14. The face 14 has a semicircular central opening 18 formed in the free edge 8. This opening 18 is centered on the axis X.

Each nose 16 has a semicircular side opening 20 formed in the free edge 8. The side openings 20 are disposed in the sides of the noses 16 that are opposite from the portion 10. Each of these openings presents a central axis lying in a plane defined by the axis X and the direction Y, and they are symmetrical to each other about the axis X.

The free edge 8 of the enlarged portion 11 lies in a second contact plane perpendicular to the longitudinal direction, that is offset upwards in FIG. 1 from the first contact plane.

The two central openings 18 of the top and bottom half-bodies 2 and 4 together form a circular opening centered on the axis X and suitable for receiving the steering column. Similarly, the side openings 20 of the top and bottom half-bodies 2 and 4 together form two circular openings suitable for receiving other components of the steering column of the motor vehicle.

The steering column is suitable for passing through the hollow body 1 so as to engage through the circular orifice formed by the openings 18, passing through the enlarged portion 12 and then through the portion 10 along its central axis, and leaving the hollow body 1 via the open axial end of the portion 10 opposite from the enlarged portion 12.

The free edges 8 of the portion 10 of the bottom half-body 4 are shaped to form grooves parallel to the axis X and they are suitable for receiving the free edges 8 of the portion 10 of the top half-body 2.

The assembly means 6 for assembling the two half-bodies to each other comprise six longitudinal tabs 22 secured to the top half-body 2, and six housings 24 formed on an inside face of the bottom half-body 4, co-operating with the tabs 22 to form snap-fastener means.

The tabs 22 and the housings 24 are formed in the enlarged portion 12 of the hollow body 1.

The tabs 22 project longitudinally towards the bottom half-body 4 relative to the second contact face between the two half-bodies. Each tab 22 comprises a longitudinal rectilinear arm 26 presenting one end secured to the top half-body 2 and a portion in relief 28 projecting from a portion of the arm that is remote from the half-body 2.

Each arm 26 comprises two plane walls 30 that are parallel to each other and spaced apart, with partitions 32 interconnecting the two walls 30 at regular intervals. The two walls 30 are perpendicular to the zone of the inside face of the half-body 2 to which the tab is secured.

Figure 3:
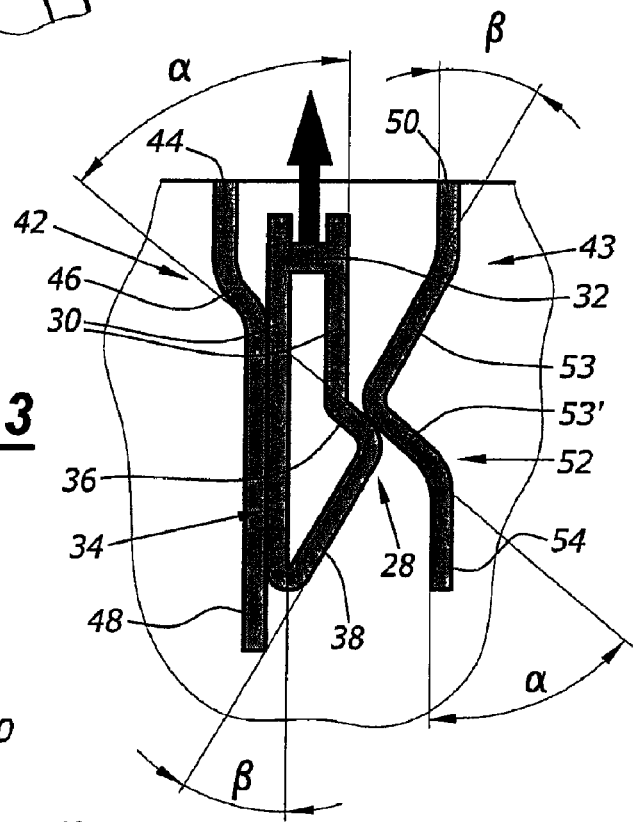
FIG. 3 is a side view of the FIG. 1 housing, a tab being engaged in the housing.

As shown in FIG. 3, the walls 30 at the free end of the tab 22 form a head 34 of triangular section in a plane perpendicular to the walls 30. For this purpose, one of the walls 30 forms a first face 36 going away from the other wall 30 that is extended by a second face 38 that converges towards the other wall 30 and that meets it so as to form a pointed end for the tab 22. The faces 36 and 38 together define the portion in relief 28. As shown in FIG. 3, the head 34 is hollow, such that the portion in relief 28 is capable of deforming.

The faces 36 and 38 form respective angles $\alpha$ and $\beta$ relative to the opposite wall 30. The angle $\alpha$ is greater than the angle $\beta$. Between them, the faces 36 and 38 form an angle of substantially 90°.

The angle $\alpha$ typically lies in the range 50° to 70°, and is preferably selected to be substantially equal to 60°.

The angle $\beta$ typically lies in the range 20° to 40°, and is preferably selected to be substantially equal to 30°.

Each housing 24 comprises two substantially parallel facing walls 42, 43 formed by ribs provided on the inside face of the bottom half-body 4 and extending substantially perpendicularly to the zone of the inside face carrying said walls. Each of these walls extends in a generally longitudinal direction from the free edge 8. Between them, the walls define at the free edge 8 an opening 40 for inserting the corresponding tab 22 into the housing 24. The wall 42 comprises, in succession going away from the free edge 8, a first longitudinal flat 44 extended by a second flat 46 sloping towards the wall 43, itself extended by a third longitudinal flat 48 that is closer to the wall 43 than is the first flat 44.

At the free edge 8, the wall 43 comprises a first longitudinal flat 50 placed facing the flats 44 and 46 of the wall 42. The wall 43 also has a convex central wedge 52 forming a constriction that locally narrows the spacing between the walls 42 and 43. Finally, the wall 43 has a third longitudinal straight flat 54 in the same plane as the first flat 50.

The constriction 52 is defined by two free faces 53 and 53' respectively facing towards the opening 40 and away from the opening 40, and meeting at a tip at the narrowest point of the constriction 52. Relative to the longitudinal direction, the faces 53' and 53 form angles $\alpha$ and $\beta$ that are respectively equal to the angles formed by the faces 36 and 38 of the portion in relief 28.

The flats 48 and 50/54 present a predetermined mutual spacing that is greater than the maximum thickness of the tab 22 between the tip of the portion in relief 28 and the wall 30 opposite from the portion in relief.

In contrast, the spacing between the flat 48 and the tip of the constriction 52 is less than said maximum thickness of the tab 22 so as to hold the tab 22 in the housing 24 once the tab 22 has snap-fastened.

The six tabs 22 are distributed along the free edge 8 of the enlarged portion 12 of the top half-body 2. A tab 22 is situated between each of the side openings 20 and the central opening 18.

The tabs 22 and the housings 24 are molded integrally with the half-bodies 2 and 4.

While the tabs 22 are being inserted into the housings 24, the pointed portion of each head 34 begins by penetrating into an opening 40. This is made easier by the fact that the first flat 44 is spaced apart from the wall 43.

Thereafter, the face 38 of the head 34 comes into contact with the face 53 of the constriction 52 that faces towards the opening 40. The face 38 slides over the constriction 52 and brings the wall 30 opposite from the portion in relief 28 against the flat 48 of the wall 42.

As the longitudinal movement of the tab 22 continues, the portion in relief 28 is deformed elastically, such that the portion in relief 28 goes past the constriction 52 and the tab 22 snap-fastens in the housing 24.

This is made easier by the fact that the head 34 is hollow. This is also made easier by the pointed profile of the head 34, with the angle $\beta$ being selected to facilitate penetration of the tab.

This leads to the situation shown in FIG. 3, in which the free edges 8 of the top and bottom half-bodies 2 and 4 are in contact with each other, the face 36 of the head 34 then bearing against the face 53' of the constriction 52 that faces away from the opening 40. The faces 36 and 53' thus form bearing surfaces that retain the tab 22 in the housing 24. The contact plane between these bearing surfaces forms an angle α with the longitudinal direction.

As shown in FIG. 3, the wall 42 forms a rear abutment for the tab, against which the wall 30 of the tab 22 opposite from the portion in relief 28 is capable of sliding.

The tab 22 can be disengaged from the housing 24 if traction is exerted on the half-bodies 2 and 4 in the direction for separating the half-bodies from each other, while applying a predetermined longitudinal force.

To this end, the angle α is selected so as to enable the portion in relief 28 to deform elastically when such a longitudinal force is exerted on the half-bodies 2 and 4.

The above-described body presents numerous advantages. The manufacturing tolerances on the top and bottom half-bodies have practically no impact on the quality of the snap-fastening between the tabs 22 and the housings 24. Large manufacturing tolerances for the half-bodies give rise essentially to a mere modification in the zones of the surfaces 36 and 53' that bear mutually one against the other.

Furthermore, it is possible to make tabs 22 and constrictions 52 that bear one against the other over a long length. This provides a large amount of tolerance on the longitudinal position of the tab 22 relative to the housing 24 when the free edges 8 of the two half-bodies come into contact one against the other.

The appearance of the hollow body is most advantageous since none of the means for assembling the two half-bodies together is visible once the half-bodies have been assembled together.

In addition, it is easy to separate the two half-bodies from each other since this is done merely by applying longitudinal traction.

The position of the tab 22 relative to the constriction 52 is particularly well defined, because this tab bears rearwards against the wall 42.

Finally, because of the flexibility of the head 34 of the tab and of the wall 43, it is possible to engage the tab 22 in the housing 24 and then to disengage it a large number of times without damaging the tab or the housing.

Figure 4:
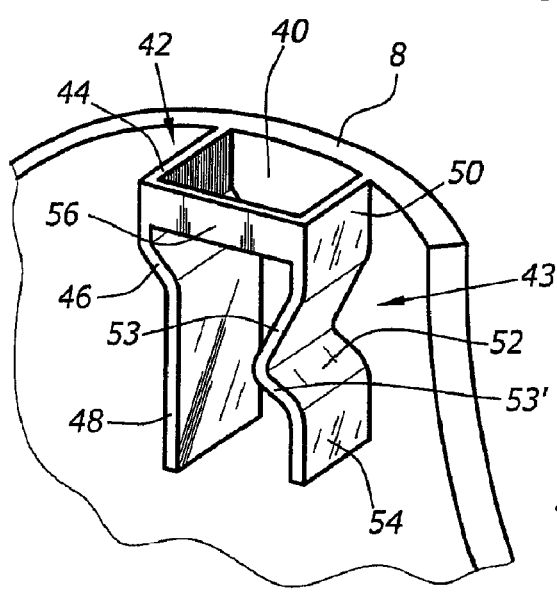
FIG. 4 is a view similar to FIG. 2, for a variant embodiment of the invention.

In a variant embodiment shown in FIG. 4, each housing 24 has a closure web 56 connecting the flat 44 of the wall 42 to the flat 50 of the wall 43.

The web 56 lies on a side of the housing 24 that is remote from the inside face of the half-body 4, i.e. that is towards the inside of the hollow body. It serves to stiffen the walls 42 and 43 and to guide the tab 22 in its movement in longitudinal translation.

In a variant or in addition, the wall 43 may be made to be elastically deformable to the right in FIG. 3 in the region of the wedge 52.

What is claimed is:

1. A hollow body of plastics material for placing around a motor vehicle steering column, the body comprising:
    first and second half-bodies; and
    assembly means for assembling the half-bodies to each other in a longitudinal direction,
    the assembly means comprising a plurality of longitudinal tabs each secured to the first half-body, and snap-fastener means for fastening each tab to the second half-body,
    each half-body comprising a concave shell with a concave side, the concave side of the first half-body facing towards the concave side of the second half-body, each of said shells presenting an inside face,
    each longitudinal tab comprising a longitudinal arm with a first end secured to the first half-body and a portion in relief projecting along a portion of the longitudinal arm remote from the first half-body, said portion in relief including a first catch bearing surface,
    and the snap-fastener means comprising, for each longitudinal tab of the first half-body, a housing formed on the inside face of the second half-body, the housing presenting an opening and being defined by at least two parallel longitudinal walls facing each other at a predetermined spacing, the longitudinal walls comprising a first wall forming a rear bearing surface for the tab and a second wall including at least one constriction locally narrowing the spacing between the two longitudinal walls, the constriction having a second bearing surface,
    the first and second walls of the housing are both substantially perpendicular to the inside face of the second half body, the constriction restricting the spacing between the first and second walls in a direction substantially parallel to said inside face,
    the longitudinal tabs being configured to be inserted longitudinally into the housings of the snap-fastening means via respective openings, at least one of the tabs and said second walls being configured to elastically deform for said tabs to pass by the constructions in the longitudinal insertion direction such that when the first and second half-bodies are assembled, the portions in relief of the longitudinal tabs are held by the constrictions by virtue of bearing surfaces of the longitudinal tabs coming into contact with complementary bearing surfaces of the constrictions having planes that are inclined relative to the longitudinal direction so that the portions in relief travel past the constrictions by elastic deformation when the first and second half-bodies are moved apart from each other by means of a predetermined longitudinal force, and
    the bearing surfaces and the complementary bearing surfaces are arranged such that when the first and second half-bodies are moved apart from one another in the longitudinal direction, said bearing surfaces and said complementary bearing surfaces come in contact with one another along a contact area extending in a plane angled in a range of 50° to 70° from the longitudinal direction, the first wall of the housing having a longitudinal flat, the longitudinal arm having a plane longitudinal wall opposite the relief, the plane longitudinal wall being flat and parallel to the longitudinal direction up to a tip of the longitudinal tab opposite the first half-body, the plane longitudinal wall and the first wall of the housing being arranged such that the plane longitudinal wall is parallel with and bears against the longitudinal flat when the first and second half-bodies are moved apart from one another in the longitudinal direction and when said bearing surfaces and said complementary bearing surfaces are in contact with one another.

2. The body according to claim 1, wherein the longitudinal walls are ribs formed on the inside face of the second half-body.

3. The body according to claim 1, wherein each portion in relief is formed on a face of the corresponding tab that is substantially perpendicular to the inside face of the half-body carrying said tab.

4. The body according to claim 1, wherein at least one housing presents a closure web on a side remote from the inside face of the half-body, the closure web interconnecting the two walls.

5. The body according to claim 1, wherein the tabs and the housings are integrally molded with the half-bodies.

6. The body according to claim 1, wherein the tabs are hollow.

7. The body according to claim 1, wherein the arms of the tabs each comprise two spaced-apart facing walls together with partitions interconnecting the two walls.

8. The body according to claim 1, wherein said walls are perpendicular to a zone of the inside face of the half-body that carries the tab.

9. The body according to claim 1, wherein the second wall has a substantially constant thickness, said second wall including a portion having said constant thickness and shaped as a convex wedge for defining the constriction, said portion having a part having said constant thickness and extending in said plane inclined at said predetermined angle with respect to the longitudinal direction.

* * * * *